United States Patent
Varma et al.

(10) Patent No.: US 7,254,200 B2
(45) Date of Patent: Aug. 7, 2007

(54) SYSTEM AND METHOD FOR FREQUENCY BURST DETECTION FOR GSM/GPRS

(75) Inventors: Gottimukkala Narendra Varma, Andhra Pradesh (IN); Usha Sahu, Andhra Pradesh (IN); Garapati Prabhu Charan, Andhra Pradesh (IN)

(73) Assignee: Hellosoft, Inc., San José, CA (US)

( * ) Notice: Subject to any disclaimer, the term of this patent is extended or adjusted under 35 U.S.C. 154(b) by 284 days.

(21) Appl. No.: 10/844,766

(22) Filed: May 13, 2004

(65) Prior Publication Data
US 2005/0254609 A1 Nov. 17, 2005

(51) Int. Cl.
*H04B 1/10* (2006.01)
*H04L 27/06* (2006.01)
*H04L 7/04* (2006.01)
*H04Q 7/00* (2006.01)

(52) U.S. Cl. .............. 375/350; 375/340; 375/343; 375/362; 455/213; 455/524; 455/525

(58) Field of Classification Search ........... 375/224, 375/340–343, 352, 364–366, 369, 316, 229, 375/230, 233, 350, 362, 285, 347; 370/503, 370/509, 510–514, 321, 337, 347, 252, 314, 370/332, 333, 436, 442, 458, 468, 470; 455/123, 455/423, 424, 525, 229
See application file for complete search history.

(56) References Cited

U.S. PATENT DOCUMENTS 5,241,688 A * 8/1993 Arora .................... 455/502
5,734,577 A * 3/1998 Chesir et al. ............ 342/159
5,742,591 A * 4/1998 Himayat et al. .......... 370/286
5,748,680 A * 5/1998 Mobin .................... 375/317
5,761,250 A * 6/1998 Lin ........................ 375/344
6,122,327 A    9/2000 Watanabe et al.
6,480,555 B1 * 11/2002 Renard et al. ............ 375/340
6,693,882 B1 * 2/2004 Gu et al. .................. 370/252
6,937,672 B1 * 8/2005 Novakov .................. 375/340
2003/0189978 A1 10/2003 Lin et al.

FOREIGN PATENT DOCUMENTS

EP      0717512 A2    6/1996

* cited by examiner

*Primary Examiner*—Mohammed Ghayour
*Assistant Examiner*—Sophia Vlahos
(74) *Attorney, Agent, or Firm*—William L. Botjer

(57) ABSTRACT

A system, method and computer program product for detecting a frequency burst in a received signal at a wireless receiver is disclosed. The invention predicts the current sample of the received signal by filtering the past samples of the received signal through an adaptive filter. A prediction error is further obtained by subtracting the actual current sample and the predicted current sample. The prediction error is then used to adapt the adaptive filter. Since the frequency burst is a substantially predictable signal, the adaptive filter adapts to accurately predict the samples of the frequency burst. Therefore, the prediction error decreases when the frequency burst is received at the receiver. The end of the frequency burst is identified using the prediction error at each discrete time instant.

20 Claims, 11 Drawing Sheets

SYSTEM AND METHOD FOR FREQUENCY BURST DETECTION FOR GSM/GPRS

BACKGROUND

The present invention relates to frequency burst detection in wireless communication systems. More specifically, the present invention relates to the detection of the FCH burst in GSM/GPRS systems.

Wireless communication systems such as GSM use a combination of FDMA (Frequency Division Multiple Access) and TDMA (Time Division Multiple Access) to provide access to multiple users. In FDMA/TDMA-based systems, frequency and timing synchronization between the receiver and transmitter is required before they start communicating data. The GSM standard provides a frequency correction burst (FCH burst) for frequency synchronization, and a synchronization burst (SCH burst) for timing synchronization in the Broadcast Control Channel (BCCH) carrier. FCH burst is required to achieve frequency synchronization. However, the accuracy of the detection of the frequency burst depends on timing synchronization. On the other hand, reliable timing synchronization cannot be achieved unless frequency synchronization is achieved with an accuracy of at least 400 to 500 Hz. So there is a need to identify the time of the occurrence of the FCH burst without using timing synchronization.

The FCH burst is in the form of 148 samples comprising successive "zero" signals. The zero signals are transmitted by using Gaussian minimum phase shift keying (GMSK). Therefore, the baseband FCH burst manifests itself as a complex sine wave of frequency $R_b/4$, where $R_b$ is the bit rate of the transmission. This FCH burst is designed to produce a substantially constant frequency shift in the carrier frequency, which may then be used for frequency correction by the GSM receiver receiving the FCH Burst. The GSM receivers detect the FCH burst in the acquisition phase and use its frequency to synchronize their local oscillators. The FCH burst boundary is also detected to synchronize the time slot boundaries with those of the base station.

However, the baseband FCH burst experiences a frequency offset due to limitations in the accuracy of local oscillators, and multipath effects and noise in the transmission channel. Therefore, FCH detection methods must account for the above-mentioned frequency offset, to successfully detect the FCH burst.

Various methods for detecting the FCH burst in the received signal are known in the art. Conventional FCH detection methods use a bandpass filter of constant bandwidth, centered at the expected frequency of the FCH burst ($R_b/4$). When the FCH burst is passed through a bandpass filter centered at $R_b/4$, the input and output powers of the bandpass filter are expected to be almost the same. However, for a data burst the output power of the bandpass filter is much lower than the input power. Therefore, the comparison of the input and output powers is used to detect the occurrence of the FCH burst. A method using a constant bandwidth bandpass filter is disclosed in U.S. patent application No. 20030189978A1, titled "Phase Difference Based Frequency Correction Channel Detector for Wireless Communication System", to Lin et al. In accordance with the method disclosed in this patent, the received signal is provided to a phase differentiator. The output of the phase differentiator is then passed through a low pass filter to limit the noise and obtain an un-notched signal. Thereafter, the un-notched signal is passed through a notch filter. The ratio of the powers of un-notched and notched signals is then calculated. When the ratio attains a value below a threshold and continues to be the same for a predetermined time, an occurrence of the FCH burst is declared.

Another approach for detecting the FCH burst uses the correlation between the received signal and a reference signal. The reference signal is chosen considering the expected frequency of the FCH burst. A correlation-based FCH detection method is provided in U.S. Pat. No. 6,122,327, titled "Radio Receiver", assigned to Sony Corporation, Tokyo, Japan. The method, in accordance with above patent, involves the sampling of the baseband received signal with an analog-to-digital converter circuit, and obtaining a correlation value of the sampled signal with a predetermined reference signal. The FCH burst is detected depending on the obtained correlation value.

The above-mentioned FCH detection methods exploit the narrow-band nature of the FCH burst. The methods based on a constant bandwidth filters chose the center frequency of the filter based on the expected frequency of the FCH burst. The correlation-based methods also use a reference signal depending on the expected frequency of the FCH burst. Therefore, the performance of these methods depends on the expected frequency of the FCH burst. In the presence of large frequency offsets, such methods fail to detect the FCH burst accurately, since the frequency of the received FCH burst differs substantially from the expected frequency.

The accuracy of methods based on a constant bandwidth filters also depends on the choice of the bandwidth of the filter. Choosing a large bandwidth allows the detection of the FCH burst, even in the presence of a relatively large frequency offset. However, large bandwidth filters are prone to false detections. On the other hand, choosing a smaller bandwidth reduces the probability of false detections, but is unsuitable for detecting the FCH burst in the presence of large frequency offsets, since it results in misses of some occurrences of the FCH burst.

A variation of the method based on constant bandwidth filter uses a bank of bandpass filters. In such methods, the filters are chosen with different central frequencies. These central frequencies are chosen so that they cover a large range of frequency offsets around the expected frequency of the FCH burst ($R_b/4$). The detection is performed by comparing the input and output powers of all the filters. This variation is more effective in reducing the misses as well as false detections. However, this improved performance is achieved at the cost of computational complexity. The number of filters required for the successful detection of the FCH burst increases with the frequency offset. Therefore, the method becomes computationally inefficient for large frequency offsets.

Another approach for detecting the FCH burst uses an adaptive bandpass filter. Methods based on adaptive filters involve the adapting of the filter parameters depending on the frequency of the received signal. One such method is disclosed in European Patent No. 0717512A2, titled "Coarse Frequency Burst Detector for a Wireless Communications Systems, Such as for Use with GSM", and assigned to AT&T Corp. This method involves obtaining the baseband signal from the received signal and derotating the baseband signal. The derotated signal is then filtered through a moving average (MA) filter with adaptive averaging window size. Thereafter, the magnitude of the output of the MA filter in used to tentatively identify the filtered burst as the FCH burst. The frequency of the tentatively identified burst is then used for the frequency compensation of the original baseband signal. The frequency compensated signal is then filtered again with a MA filter with a window size, which is larger than the one used for the previous filtering. The output of the MA filter is then used to confirm the tentatively detected FCH burst. Therefore, the method adapts a combination of frequency compensation and adaptive averaging window-size to accurately detect the FCH burst. The method takes a two-step approach in which the window-size adaptation and frequency compensation has to be performed for all tentatively detected bursts. This makes the method computationally inefficient.

Another method, using an adaptive filter, is proposed in U.S. Pat. No. 5,241,688, titled "Frequency and Time Slot Synchronization Using Adaptive Filtering", and assigned to Motorola, Inc. Schaumburg, Ill. The method, in accordance with the above patent, involves the filtering of the received signal with an adaptive band-pass filter and buffering the received signal in a memory. The energies of the input signal and the filtered signal are estimated and the gain of the filter is adapted, based on the difference between the energies. Further, the pole of the filter is adapted so that the pass-band of the filter encompasses the received signal. The minimum value of the adapted gain signifies a narrow-band signal and is used to detect the FCH burst in the received signal. Since the method calculates the filter parameters to be adapted at each sample, a substantial amount of computation is required for each sample of data. Additionally, the filter used is an infinite impulse response (IIR) filter. Since the pole of the filter is adapted to the frequency of the received signal, a control logic is required to avoid the instability of the filter. This control logic further adds to the computational complexity of this method.

The above-mentioned FCH burst detection methods using non-adaptive filters suffer from either misses or false detections. Further, the performance of these methods is sensitive to the frequency offset present in the received signal. The adaptive filter based methods providing accurate FCH burst detection with fewer false detections, are computationally complex. Therefore, there exists a need for a computationally efficient method, which can detect the FCH burst with fewer misses or false detections. Further, there exists a need for a FCH detection method that is insensitive to the magnitude of frequency offset in the received signal.

SUMMARY

The present invention is directed towards a method, a system and a computer program product for detecting a frequency burst in a received signal at a wireless receiver.

An objective of the present invention is to detect the frequency burst in a received signal with a fewer misses in detection.

A further objective of the present invention is to detect the frequency burst in the received signal with fewer false detections.

Another objective of the present invention is to detect the frequency burst in the received signal in a computationally efficient manner.

Yet another objective of the present invention is to detect the frequency burst in a in a manner insensitive to the frequency offset present in the received signal.

The present invention provides a system, a method and a computer program product for achieving the above-mentioned objectives. The present invention first predicts the current sample of the received signal, by filtering the past samples of the received signal through an adaptive filter. Further, the present invention obtains a prediction error by subtracting the predicted current sample from the actual current sample of the received signal. Thereafter, the adaptive filter is adapted using the prediction error. Since the frequency burst is a substantially predictable signal, the adaptive filter adapts to accurately predict the samples of the frequency burst. Therefore, the prediction error decreases when the frequency burst is received at the receiver. The prediction error of the adaptive filter, at each discrete time instant, is then used to locate the frequency burst in the received signal. The locating of the frequency burst is performed in two stages. First the presence of the frequency burst is established at a particular sample by using the prediction inaccuracy at that particular sample. Thereafter, the exact end of the frequency burst is located at the sample after which the prediction error diverges. The present invention is implemented by optionally using one of the two approaches of implementing an adaptive filter, namely the Finite Impulse Response (FIR) filter approach and the Infinite Impulse Response (IIR) filter approach. The FIR-based implementation is computationally efficient. On the other hand, the IIR-based approach provides high accuracy in the detection of the frequency burst.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF THE PREFERRED EMBODIMENTS

The present invention provides a system, a method and a computer program product for detecting a frequency burst in a received signal at a wireless receiver. The present invention predicts the current sample of the received signal from the past samples of the received signal by using an adaptive filter. The adaptive filter operates in a predictor mode. Further, the adaptive filter is adapted by using the prediction error. The data bursts, received at the receiver, have a broad bandwidth, and therefore cannot be predicted easily. Therefore for data bursts, which have a large bandwidth, the prediction error is large. On the other hand, the frequency burst, being a complex sine wave, is a substantially predictable signal. Therefore, for the frequency burst the prediction error is small. As a result, the prediction error for the frequency burst is substantially lesser than that for data bursts. This property of the prediction error is used to detect the presence of the frequency burst.

Figure 1:
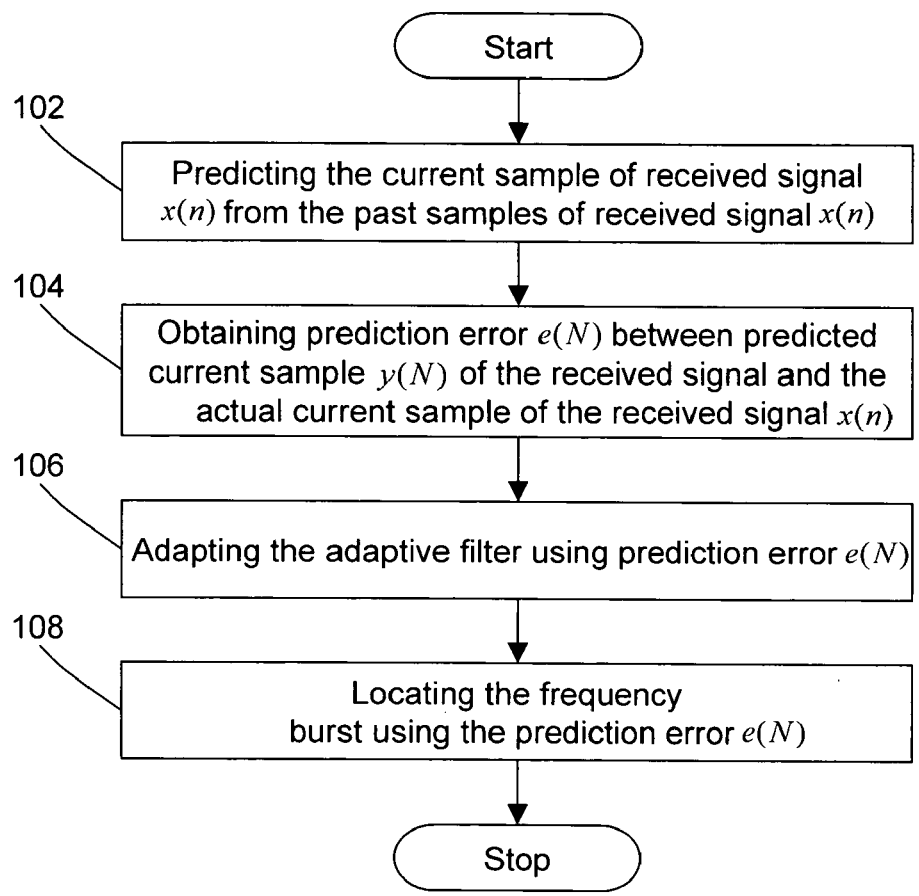
FIG. 1 is a flowchart illustrating a method of detecting a frequency burst in a received signal, in accordance with the present invention.

Referring to FIG. 1, a method of detecting a frequency burst in a received signal, in accordance with the present invention, is hereinafter described. The received signal is represented as x(n), where n denotes the discrete time instant under consideration. The present method is executed at each discrete time instant. The sample of received signal x(n) received at a discrete time instant N, hereinafter referred to as the current discrete time instant, is selected as an actual current sample x(N). Actual current sample x(N) is then analyzed for the presence of the frequency burst. At step 102, the past samples of received signal x(n) are used to obtain a predicted current sample y(N) of received signal x(n). Predicted current sample y(N) is obtained by filtering the past samples of received signal x(n) through an adaptive filter. At step 104, a prediction error e(N) between predicted current sample y(N) and actual current sample x(N) is calculated as:

$$e(N)=x(N)-y(N) \qquad (1)$$

Thereafter, the adaptive filter is adapted, depending on prediction error e(N), at step 106. The adaptive filter is adapted so that prediction error e(N) is less if the same set of past samples of received signal x(n) is filtered through the adapted adaptive filter. In other words, the adaptive filter is adapted to predict the current sample of received signal x(n) with increased accuracy. Prediction error e(N) converges if the past samples of received signal x(n) are samples of the frequency burst. Also, prediction error e(N) diverges when actual current sample x(N) is the sample occurring immediately after the end of the frequency burst. Therefore, the frequency burst is located by using prediction error e(N) at step 108. Step 108 of locating the frequency burst is further explained with reference to FIGS. 3A and 3B.

The method described, with reference to FIG. 1, is performed by optionally using one of the two approaches of implementing a digital filter, namely the Finite Impulse Response (FIR) filter approach and the Infinite Impulse Response (IIR) filter approach. An embodiment of the present invention, wherein the method is performed by using an adaptive FIR filter, is explained with reference to FIG. 6A and FIG. 6B. Specifically, step 102 and step 106 are explained with reference to FIG. 6A and FIG. 6B, respectively. This embodiment is hereinafter referred to as the FIR embodiment.

An embodiment of the present invention, wherein the method described with reference to FIG. 1 is performed by using an adaptive IIR filter, is explained with reference to FIG. 8A and FIG. 8B. Specifically, step 102 and step 106 are explained with reference to FIG. 8A and FIG. 8B, respectively. This embodiment is hereinafter referred to as the IIR embodiment.

Figure 2:
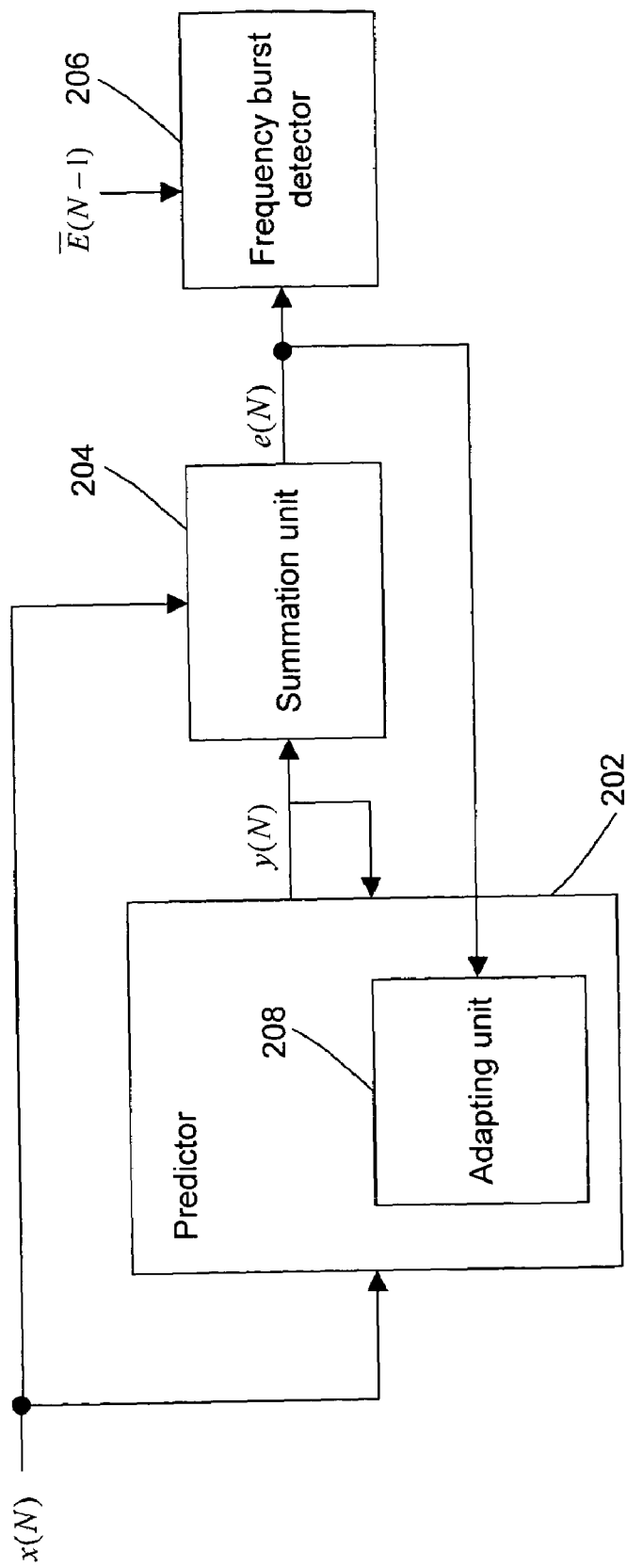
FIG. 2 is a block diagram illustrating a system for detecting a frequency burst in a received signal, in accordance with the present invention.

Referring primarily to FIG. 2, a system for detecting a frequency burst in a received signal, in accordance with the present invention, is hereinafter described. The system comprises a predictor 202, a summation unit 204 and a frequency burst detector 206. Predictor 202 obtains predicted current sample y(N) by filtering the past samples of received signal x(n) through the adaptive filter. Summation unit 204 obtains prediction error e(N) between predicted current sample y(N) and actual current sample x(N) by using equation (1) set forth above. Predictor 202 comprises an adapting unit 208, which adapts predictor 202 by using prediction error e(N). Further, frequency burst detector 206 uses prediction error e(N) to locate the frequency burst. Frequency burst detector 206 is further explained with reference to FIG. 4 and FIG. 5.

Predictor 202 and adapting unit 208 are implemented by optionally using one of the FIR filter and IIR filter approaches. In the FIR embodiment of the present invention, predictor 202 and adapting unit 208 is implemented by using the FIR filter approach. A system, in accordance with the FIR embodiment, is explained with reference to FIG. 7. In the IIR embodiment of the present invention, predictor 202 and adapting unit 208 are implemented by using the IIR filter approach. Predictor 202, in accordance with the IIR embodiment, is explained with reference to FIG. 9. Also, adapting unit 208, in accordance with the IIR embodiment, is explained with reference to FIG. 10.

Figure 3A:
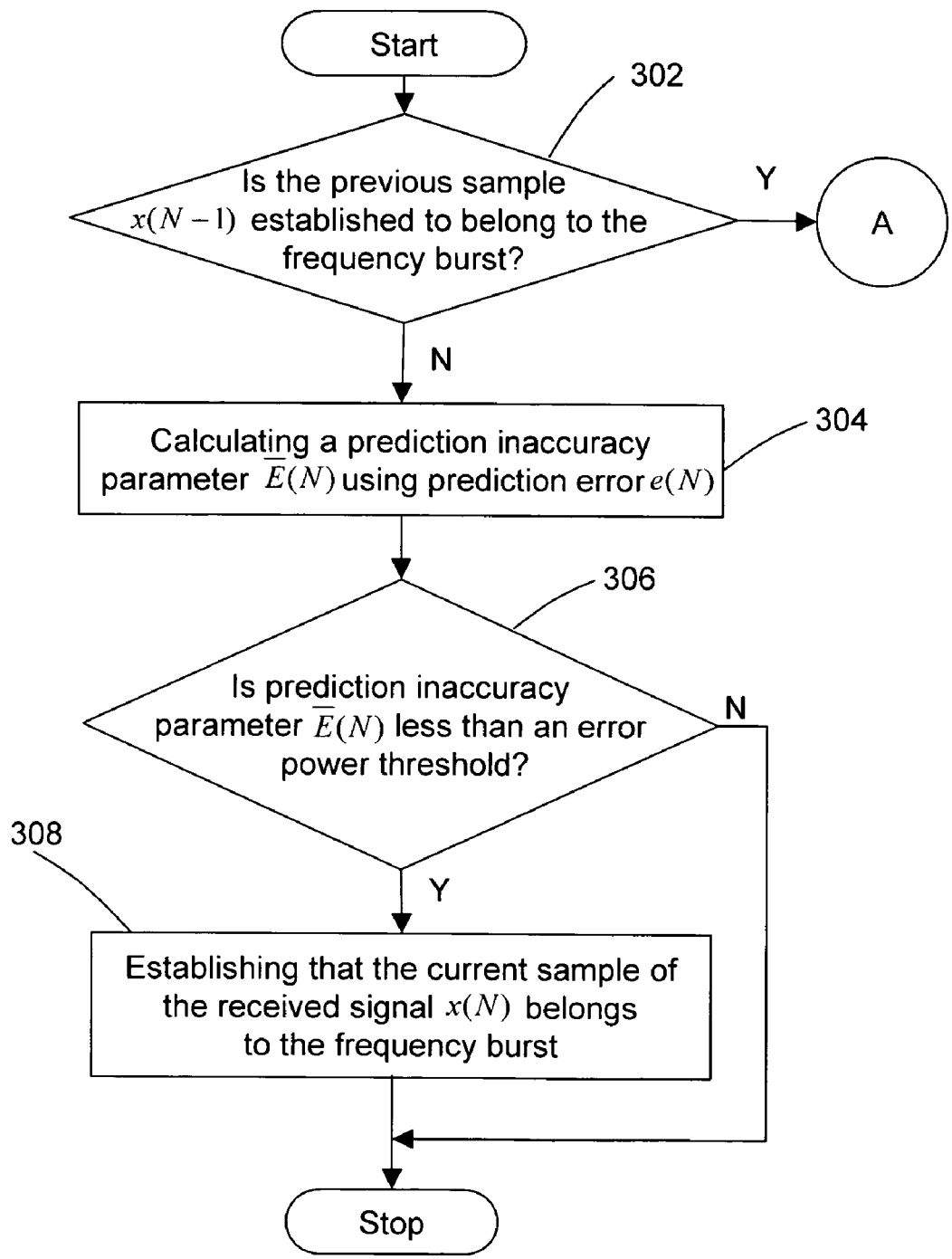
FIG. 3A is a flowchart illustrating a method of detecting the presence of the frequency burst, in accordance with the present invention.
Figure 3B:
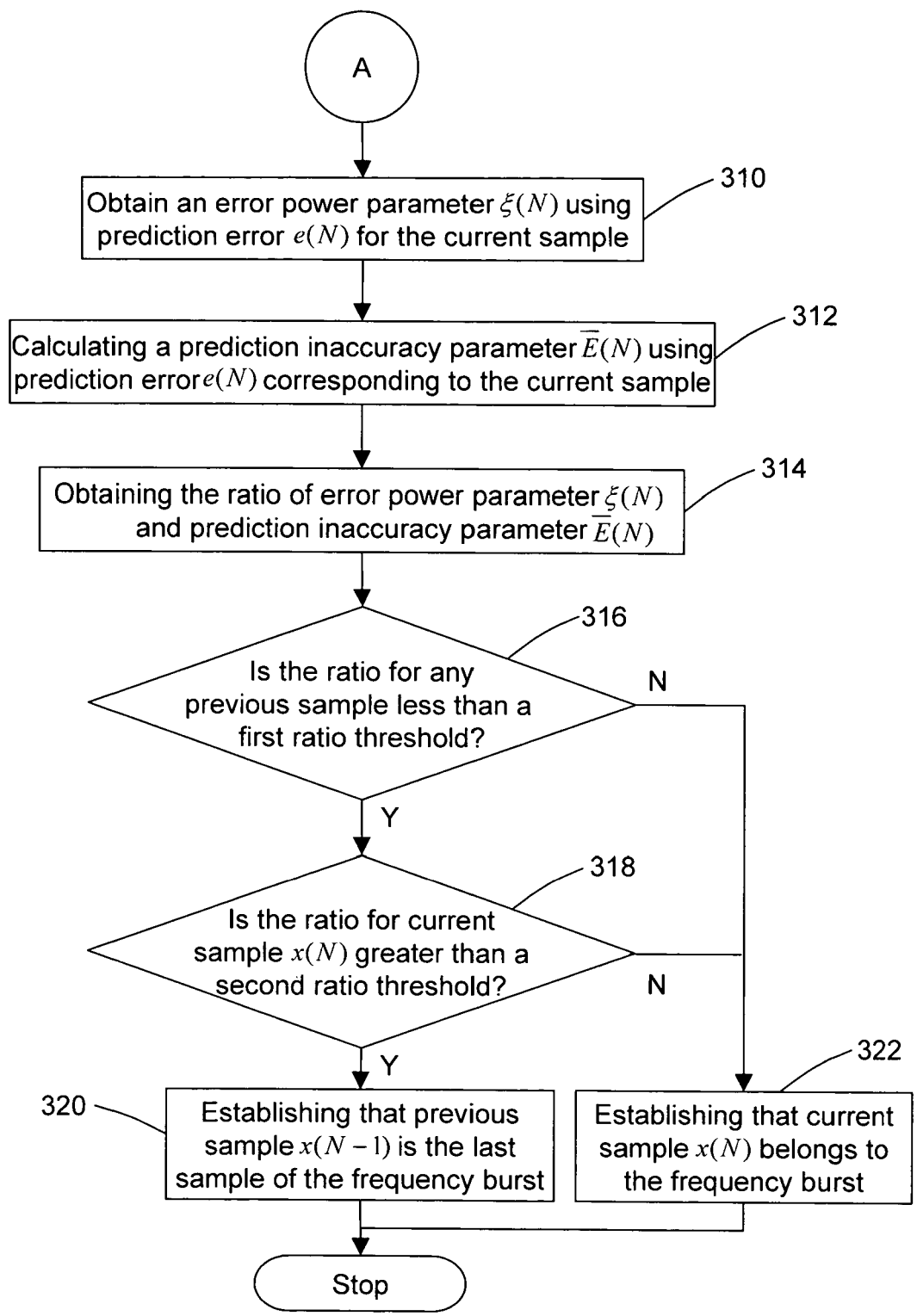
FIG. 3B is a flowchart illustrating a method of locating the end of the frequency burst, in accordance with the present invention.

Referring now primarily to FIGS. 3A and 3B, step 108 of locating the frequency burst, in accordance with the present invention, is hereinafter described. A two-stage approach is taken to locate the frequency burst in received signal x(n). The presence of the frequency burst is first determined at a particular sample, i.e. it is determined whether a particular sample belongs to the frequency burst. The method of detecting the presence of the frequency burst is described with reference to FIG. 3A. Once a particular sample is established to belong to the frequency burst, the succeeding samples are analyzed to establish the exact end of the frequency burst. Until the end of the frequency burst is established, the succeeding samples are considered to belong to the frequency burst. The method of establishing the exact end of the frequency burst is described with reference to FIG. 3B.

Referring now primarily to FIG. 3A, the method of detecting the presence of the frequency burst, in accordance with the present invention, is hereinafter described. Step 108 of locating the frequency burst comprises a step 302 of verifying whether previous sample x(N−1) is already established to belong to the frequency burst. If previous sample x(N−1) is not established to belong to the frequency burst, at step 304, a prediction inaccuracy parameter $\overline{E}(N)$, described below, is calculated using prediction error e(N) corresponding to current sample x(N). Thereafter, prediction inaccuracy parameter $\overline{E}(N)$ is compared to an error power threshold at step 306. The error power threshold is defined so that it is greater than prediction inaccuracy parameters $\overline{E}(n)$, obtained for samples from the frequency burst. Further, the error power threshold is normalized by using the power of received signal x(n). If prediction inaccuracy parameter $\overline{E}(N)$ is less than the error power threshold, current sample x(N) is established to belong to the frequency burst at step 308.

Referring now primarily to FIG. 3B, the method of establishing the end of the frequency burst is hereinafter described. If, at step 302, previous sample x(N−1) is established to belong to the frequency burst, prediction error e(N) corresponding to current sample x(N) is analyzed to establish whether previous sample x(N−1) is the last sample of the frequency burst. If previous sample x(N−1) is established to belong to the frequency burst, an error power parameter ξ(N) described below is obtained using prediction error e(N) at step 310. Thereafter, prediction inaccuracy parameter $\overline{E}$(N) is obtained at step 312. Further, the ratio of error power parameter ξ(N) and prediction inaccuracy parameter $\overline{E}$(N) is calculated at step 314. The ratio is then analyzed to verify two conditions. At step 316, it is verified whether any of the previous samples belonging to the frequency burst has yielded a ratio less than a first ratio threshold. If this condition is verified, the ratio is used to verify the second condition at step 318. At step 318, the ratio corresponding to current sample x(N) is verified to be greater than a second ratio threshold. If the second condition is also verified, it is established that previous sample x(N−1) is the last sample of the frequency burst at step 320. If any of the two conditions is not verified, it is concluded that previous sample x(N−1) is not the last sample of the frequency burst. Therefore, it is established that current sample x(N) belongs to the frequency burst at step 322.

In an embodiment of the present invention, the moving average of prediction error e(N) is used as prediction inaccuracy parameter $\overline{E}$(N), and steps 304 and 312 of calculating prediction inaccuracy parameter $\overline{E}$(N) are performing using the relation:

$$\overline{E}(N)=(1-\rho)*\overline{E}(N-1)+\rho*|e(N)|^2 \qquad (2)$$

where ρ is the forgetting factor of the moving average. In an embodiment of the present invention forgetting factor ρ is selected to be 0.03125. In another embodiment of the present invention, the average power of prediction error e(n) over P previous discrete time instants is used as prediction inaccuracy parameter $\overline{E}$(N). In accordance with this embodiment, steps 304 and 312 are performed by obtaining prediction inaccuracy parameter $\overline{E}$(N) as:

$$\overline{E}(n) = \frac{\sum_{k=0}^{P} |e(N-k)|^2}{P} \qquad (3)$$

The above-mentioned measures of the prediction inaccuracy, which can be used as prediction inaccuracy parameter $\overline{E}$(N), are provided for illustrating the present invention clearly and in no way limit the scope of the invention, which can be implemented with various other measures of prediction inaccuracy.

In an embodiment of the present invention, the absolute value |e(N)| of prediction error e(N) is used as error power parameter ξ(N), and the ratio is calculated as $$\frac{|e(N)|}{\overline{E}(N)}$$

at step 314. In another embodiment of the present invention, the power of prediction error e(N) is used as error power parameter ξ(N). The above-mentioned measures of the power of prediction error e(N), which can be used as error power parameter ξ(N), are provided for illustrating the present invention clearly and in no way limit the scope of the invention, which can be implemented with various other measures of the power of the prediction error.

In various wireless communication standards, the frequency bursts are of known length. For example, in the Global System for Mobile (GSM), the length of the frequency burst used as the frequency correction burst (FCH burst) is 148 symbols. The above example is provided to clearly illustrate the invention and in no way limits the scope of the invention, which can be implemented with various other communication standards. In communication networks, where the length of the frequency burst is known, the known length, along with the location of the last sample of the frequency burst, is used to locate the start of the frequency burst.

Figure 4:
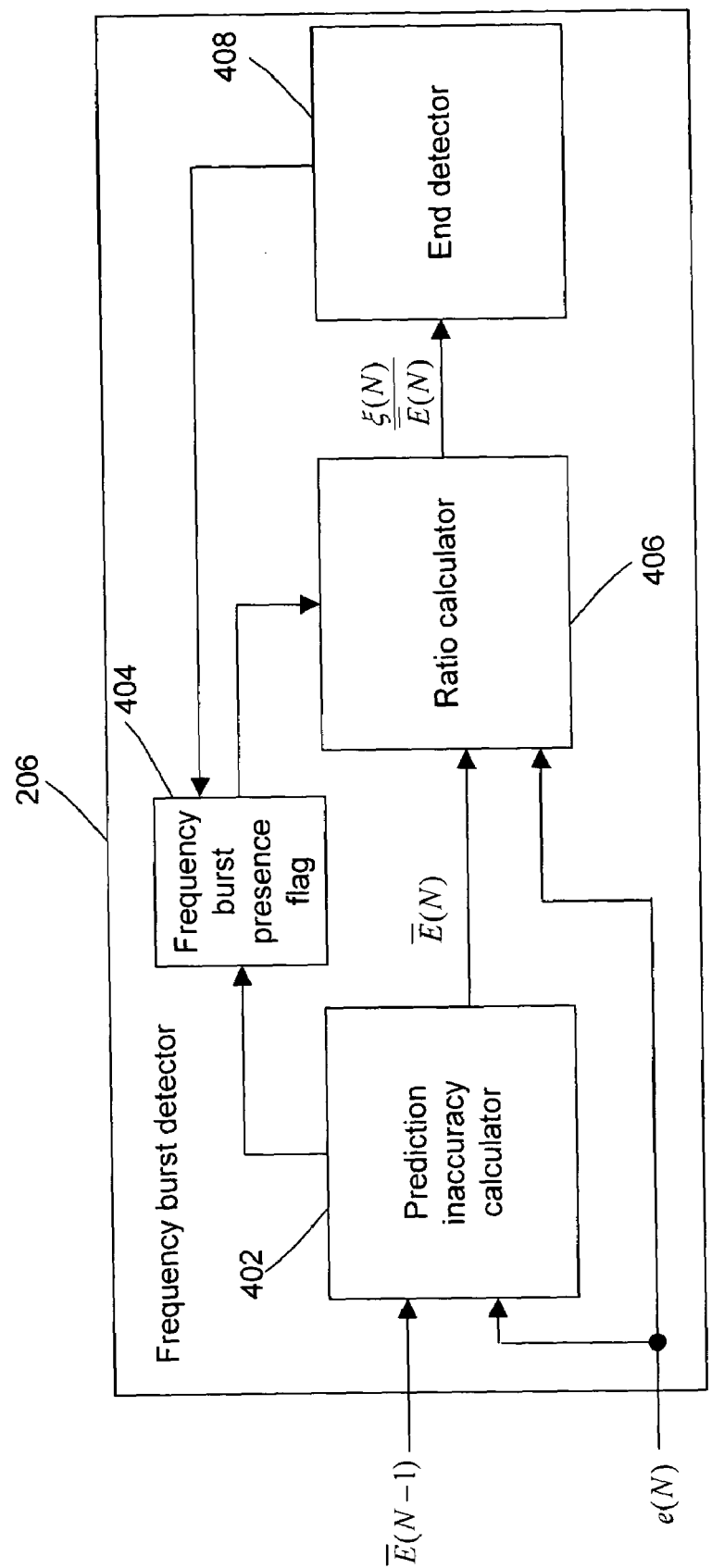
FIG. 4 is a block diagram illustrating a frequency burst detector, in accordance with the present invention.

Referring now primarily to FIG. 4, frequency burst detector 206, in accordance with an embodiment of the present invention, is hereinafter described. Frequency burst detector 206 comprises a prediction inaccuracy calculator 402, a frequency burst presence flag 404, a ratio calculator 406, and an end detector 408. Prediction inaccuracy calculator 402 calculates prediction inaccuracy parameter $\overline{E}$(N) at current discrete time instant N. If prediction inaccuracy parameter $\overline{E}$(N) is found to be less than the error power threshold, frequency burst presence flag 404 is set by prediction inaccuracy calculator 402. Ratio calculator 406 calculates error power parameter ξ(N) using prediction error e(N), if frequency burst presence flag 404 is set. Ratio calculator 406 further obtains the ratio of error power parameter ξ(N) and prediction inaccuracy parameter $\overline{E}$(N). Thereafter, end detector 408 establishes whether previous sample x(N−1) is the last sample of the frequency burst. Further, if previous sample x(N−1) is established as the last sample of the frequency burst, frequency burst presence flag 404 is reset. End detector 408 is further explained with reference to FIG. 5.

Figure 5:
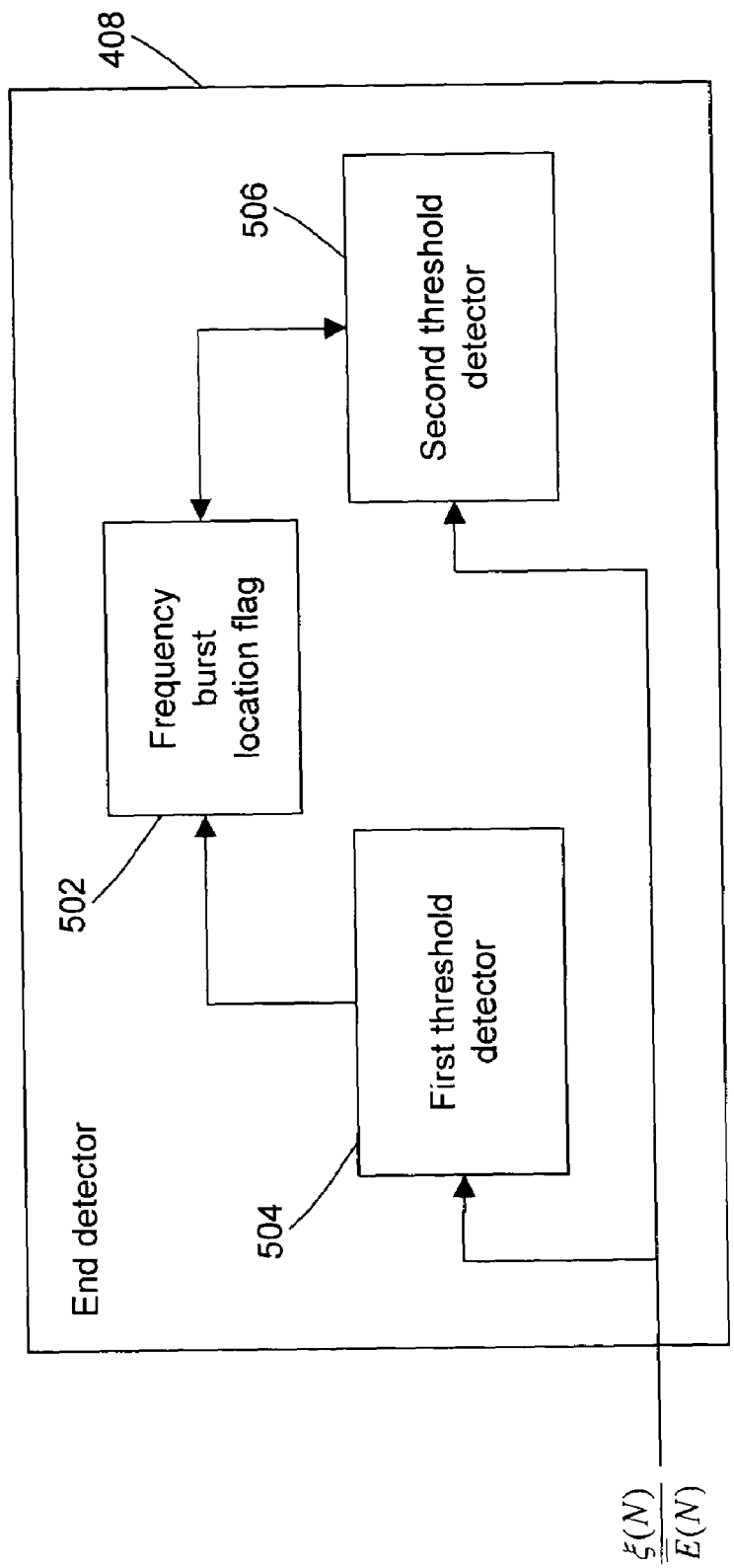
FIG. 5 is a block diagram illustrating an end detector for locating the end of the frequency burst, in accordance with the present invention.

Referring now primarily to FIG. 5, end detector 408, in accordance with the present invention, is hereinafter described. End detector 408 comprises a frequency burst location flag 502, a first threshold detector 504, and a second threshold detector 506. First threshold detector 504 compares the ratio obtained by ratio calculator 406 to the first ratio threshold. If the ratio is found to be less than the first ratio threshold, then frequency burst location flag 502 is set by first threshold detector 504. Second threshold detector 506 compares the ratio obtained by ratio calculator 406 to the second ratio threshold, if frequency burst location flag 502 is set. If the ratio is found to be greater than the second ratio threshold, previous sample x(N−1) is established as the last sample of the frequency burst, and both frequency burst presence flag 404 and frequency burst location flag 502 are reset.

Figure 6A:
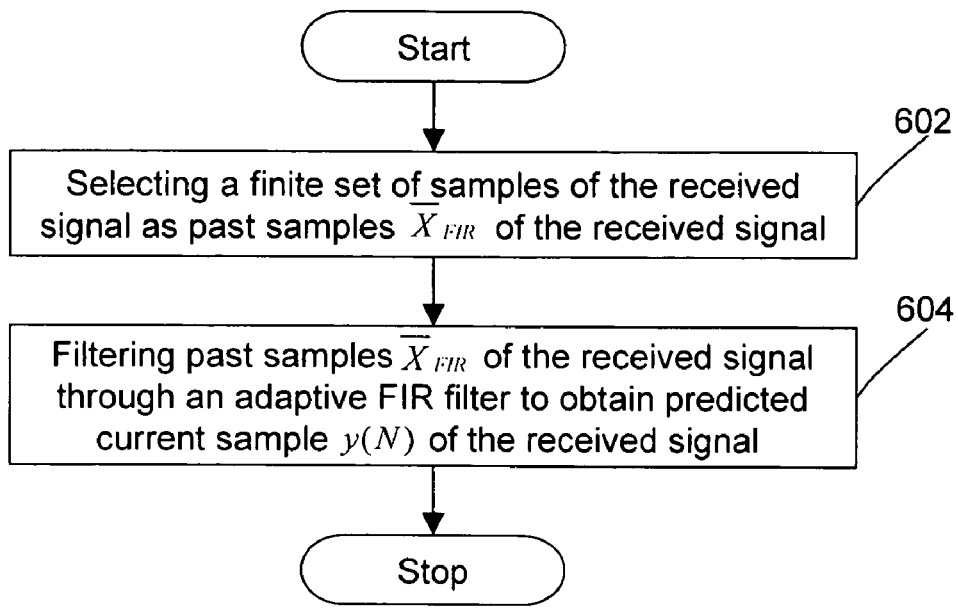
FIG. 6A is a flowchart illustrating a method of predicting the current sample of the received signal, in accordance with an FIR embodiment of the present invention.

Referring now primarily to FIG. 6A, step 102 of predicting the current sample of received signal x(n), in accordance with the FIR embodiment, is hereinafter described. Step 102 comprises selecting a finite set of samples of received signal x(n) as finite past samples $\overline{X}_{FIR}$ at step 602. A finite number of samples, that has been received a predefined number of discrete time instants D before current discrete time instant N, are selected as finite past samples $\overline{X}_{FIR}$. Finite past samples $\overline{X}_{FIR}$ are defined as {{x(N−D−k); k∈I, k∈[0, K−1]}, where K is the number of coefficients of the FIR filter used. The value of D is selected between 2 and 10, depending on the desired performance of the prediction method. In other words, an optimum value of D is chosen so that the number of misses and false detections of the frequency burst are less. Finite past samples $\overline{X}_{FIR}$ is then filtered through an adaptive FIR filter to obtain predicted current sample y(N) of received signal x(n) at step 604. Step 604 of filtering is performed by using the equation:

$$y(N) = \sum_{k} h_k(N) \times (N-D-k) \qquad (4)$$

where k is an integer varying from 0 to K−1, and $h_k(n)$ represents the $k^{th}$ coefficient of the adaptive FIR filter at the $n^{th}$ discrete time instant.

Figure 6B:
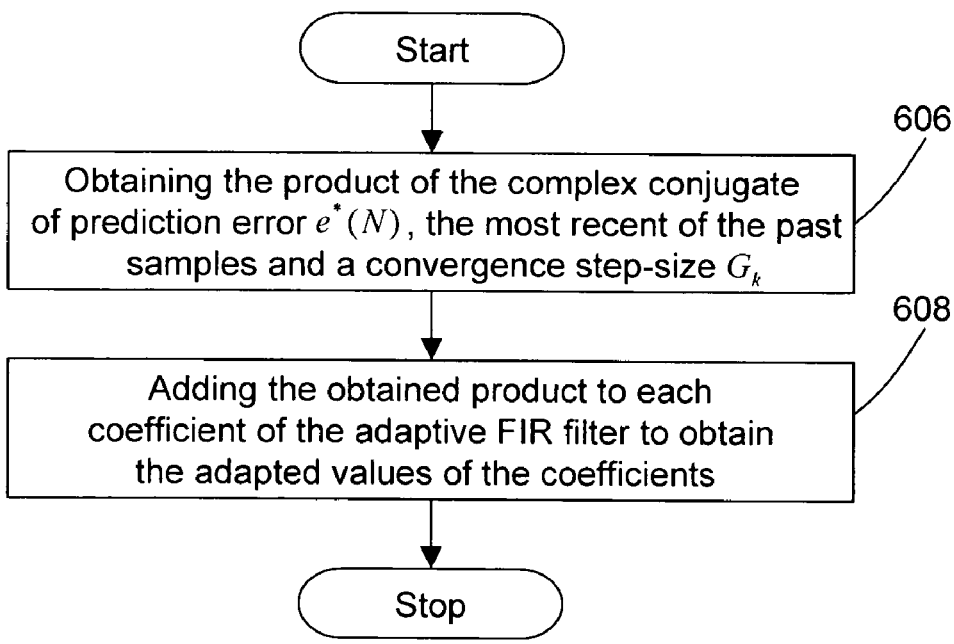
FIG. 6B is a flowchart illustrating a method of adapting an adaptive filter, in accordance with an FIR embodiment of the present invention.

Referring now primarily to FIG. 6B, step 106 of adapting the adaptive FIR filter, in accordance with the FIR embodiment, is hereinafter described. In accordance with the FIR embodiment, step 106 further comprises obtaining the product of complex conjugate e*(N) of prediction error e(N), $k^{th}$ sample x(N−D−k) of finite past samples $\overline{X}_{FIR}$, and a convergence step-size $G_k$ corresponding to the $k^{th}$ coefficient $h_k(N)$, at step 606. Thereafter, at step 608, the obtained product is added to $k^{th}$ coefficient $h_k(N)$ of the adaptive FIR filter, to obtain adapted $k^{th}$ coefficient $h_k(N+1)$. Step 608 is performed by using the equation:

$$h_k(N+1) = h_k(N) + G_k^* e^*(N)^* x(N-D-k) \qquad (5)$$

Step 606 and 608 are repeated for each coefficient from set of coefficients {$h_k(N)$; k∈I, k∈[0, K−1]} of the adaptive FIR filter. In an embodiment of the present invention, identical values of convergence step-size $G_k$ are selected for all coefficients $h_k(N)$.

Figure 7:
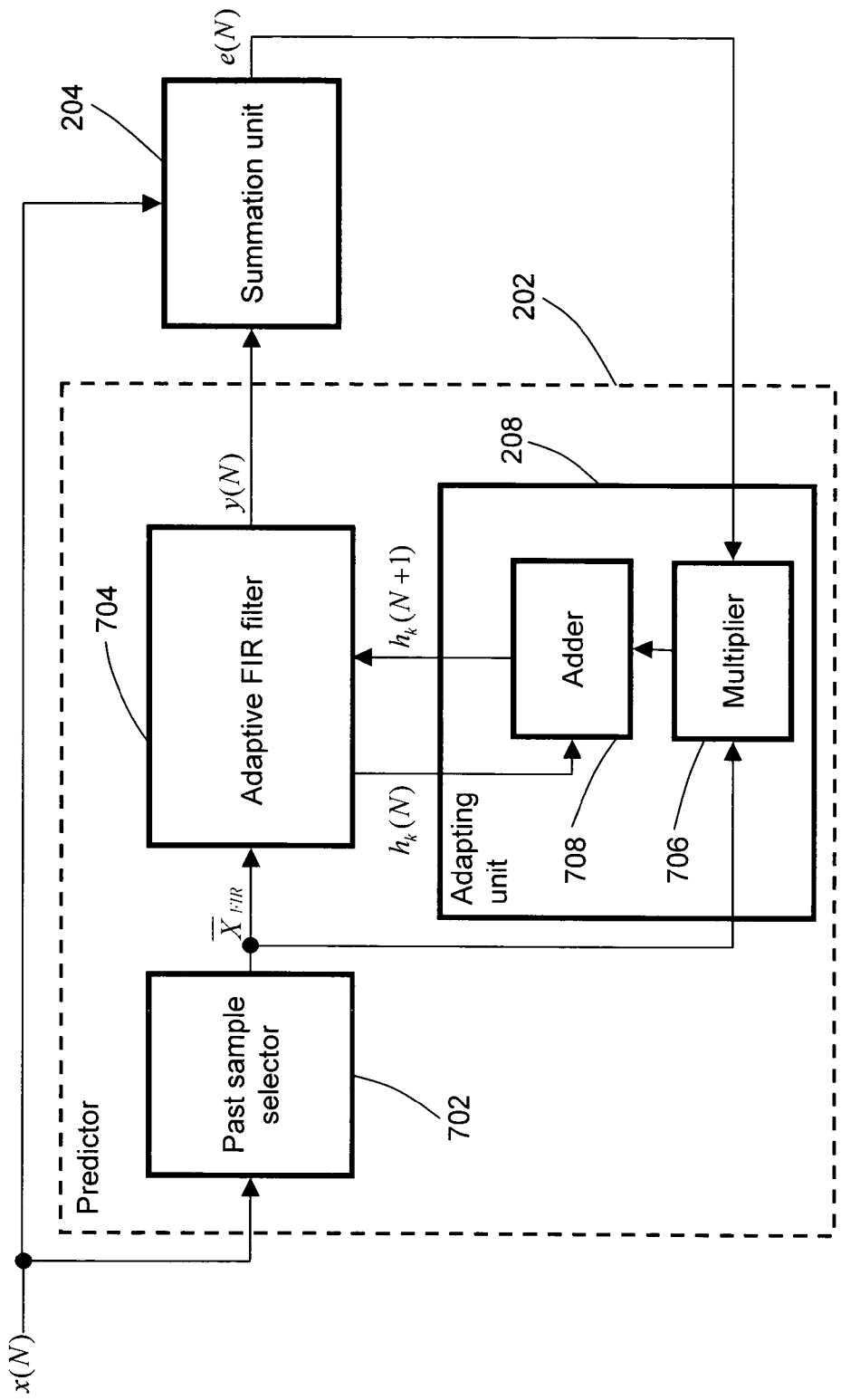
FIG. 7 is a block diagram illustrating a predictor, in accordance with an FIR embodiment of the present invention.

Referring now primarily to FIG. 7, predictor 202, in accordance with the FIR embodiment, is hereinafter described. In accordance with the FIR embodiment, predictor 202 comprises a past sample selector 702 and an adaptive FIR filter 704, in addition to adapting unit 208. Past sample selector 702 selects a finite set of samples {{x(N−D−k); k∈I, k∈[0, K−1]} of received signal x(n) as finite past samples $\overline{X}_{FIR}$. Adaptive FIR filter 704 filters finite past samples $\overline{X}_{FIR}$ to obtain predicted current symbol y(N), by using equation (4). In accordance with the FIR embodiment, adapting unit 208 comprises a multiplier 706 and an adder 708. Multiplier 706 obtains the product of complex conjugate e*(N) of prediction error e(N), $k^{th}$ sample x(N−D−k) of finite past samples $\overline{X}_{FIR}$, and convergence step-size $G_k$ corresponding to the $k^{th}$ coefficient $h_k(N)$. Adder 708 updates each coefficient from set of coefficients {$h_k(N)$; k ∈I, k∈[0, K−1]} of adaptive FIR filter 704 by using equation (5).

In an FIR embodiment of the present invention the value of convergence step-size $G_k$ is chosen to be 0.08 and the number of coefficients K of the FIR filter is chosen to be 12.

Figure 8A:
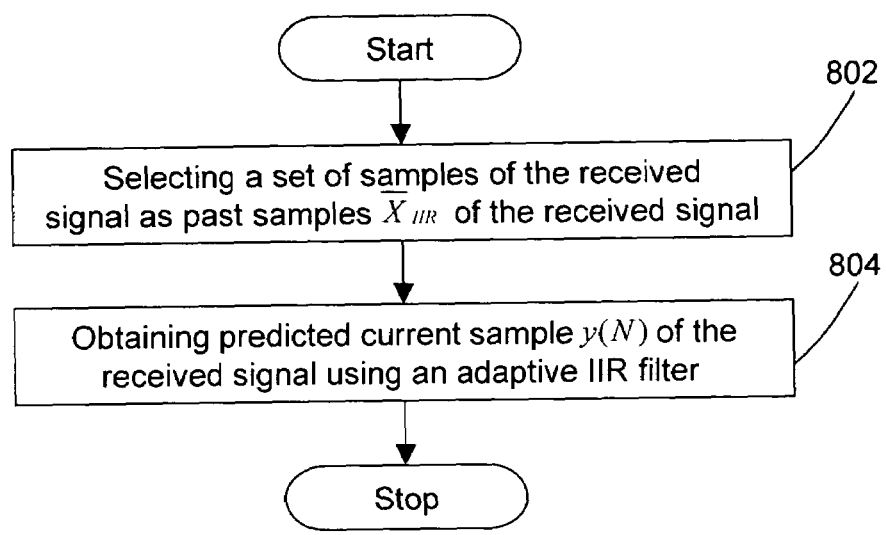
FIG. 8A is a flowchart illustrating a method of predicting the current sample of the received signal, in accordance with an IIR embodiment of the present invention.

Referring now primarily to FIG. 8A, step 102 of predicting the current sample of received signal x(n), in accordance with the IIR embodiment, is hereinafter described. In accordance with the IIR embodiment, step 102 comprises a step 802 of selecting a set of samples of received signal x(n), as past samples $\overline{X}_{IIR}$. The samples, which have been received in a predefined number of discrete time instants D before current discrete time instants N, are selected as past samples. At step 804, predicted current sample y(N) is obtained using past samples $\overline{X}_{IIR}$ and a set of previously predicted samples. In an embodiment of the present invention, two samples received D time instants before current discrete time instants N are selected as $\overline{X}_{IIR}$. In this embodiment of the present invention, past samples $\overline{X}_{IIR}$ are defined as {x(N−D), x(N−D−1)}. Further, previously predicted samples y(N−1) and y(N−2) are used as the set of previously predicted samples. In accordance with this embodiment, step 804 of obtaining predicted current sample y(N) is performed by using the equation:

$$y(N) = (1+s(N))w(N)y(N-1) - s(N)y(N-2) + (1-s(N))(w(N)x(N-D) - x(N-D-1)) \qquad (6)$$

where w(n) denotes a discrete center frequency parameter of the adaptive IIR filter at $n^{th}$ discrete time instant, and s(n) denotes a bandwidth-controlling factor of the adaptive IIR filter at $n^{th}$ discrete time instant. Discrete center frequency parameter w(N) is related to the discrete center frequency f(N) of the adaptive filter by the relation w(N)=cos f(N). Further, bandwidth-controlling factor s(N) varies in the range of 0 to 1.

Figure 8B:
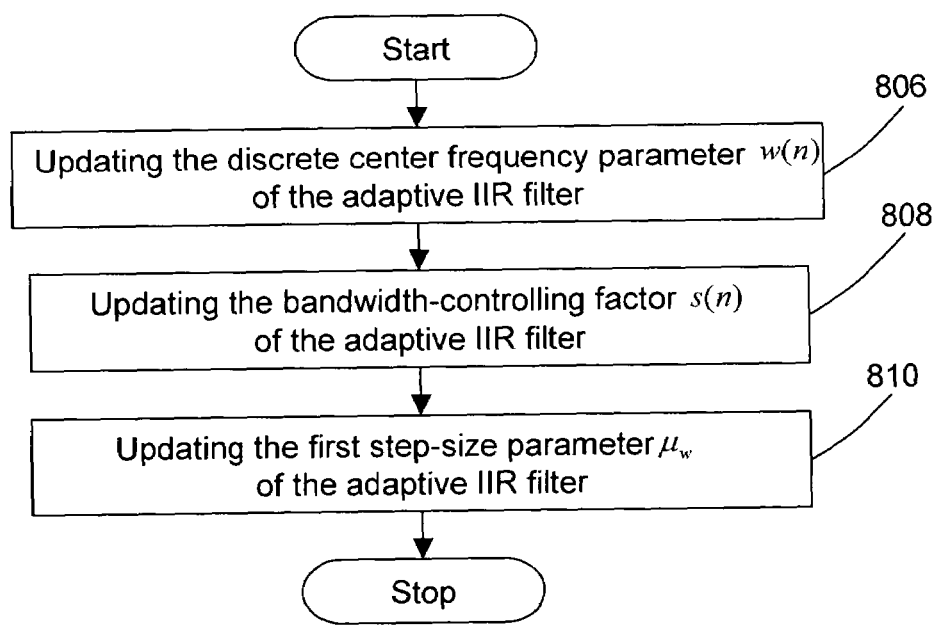
FIG. 8B is a flowchart illustrating a method of adapting an adaptive filter in accordance with an IIR embodiment of the present invention.

Referring now primarily to FIG. 8B, step 106 of adapting the adaptive filter, in accordance with the IIR embodiment, is hereinafter described. In accordance with the IIR embodiment, step 106 comprises updating discrete center frequency parameter w(n) at step 806, by using the equation:

$$w(N+1) = w(N) + 2\,\mu_w \text{real}(e(N)\alpha(N)^*) \qquad (7)$$

where $\mu_w$ is a first step-size parameter and α(n) denotes the partial derivative of y(n) with respect to w(n), at the $n^{th}$ discrete time instant. At step 808, bandwidth-controlling factor s(n) is updated by using the equation:

$$s(N+1) = s(N) + 2\mu_s \text{real}\left(\frac{1}{(1 \cdot s(N))^2} y^2(N) + \frac{1+s(N)}{1-s(N)} y(N)\beta(N)\right) \qquad (8)$$

where $\mu_s$ is a second step-size parameter and β(n) denotes the partial derivative of y(n) with respect to s(n) at the $n^{th}$ discrete time instant. At step 810, first step-size parameter $\mu_w$ is calculated by using the equation:

$$\mu_w = 0.1(1-s(N))^3 \qquad (9)$$

In step 806 of updating discrete center frequency parameter w(n), α(N) is calculated by using the equation:

$$\alpha(N) = (1+s(N))w(N)\alpha(N-1) - s(N)\alpha(N-2) + (1+s(N))y(N-1) + (1-s(N))x(N-D) \qquad (10)$$

Further, in step 808 of updating bandwidth-controlling factor s(n), β(N) is calculated by using the equation:

$$\beta(N) = (1+s(N))w(N)\beta(N-1) - s(N)\beta(N-2) - (w(N)e(N-1) - e(N-2)) \qquad (11)$$

In an IIR embodiment of the present invention second step-size parameter $\mu_s$ is chosen to be 0.0001, the initial value of the bandwidth-controlling factor s(n) is selected as 0.65, and the value of D is selected between 2 and 10.

Figure 9:
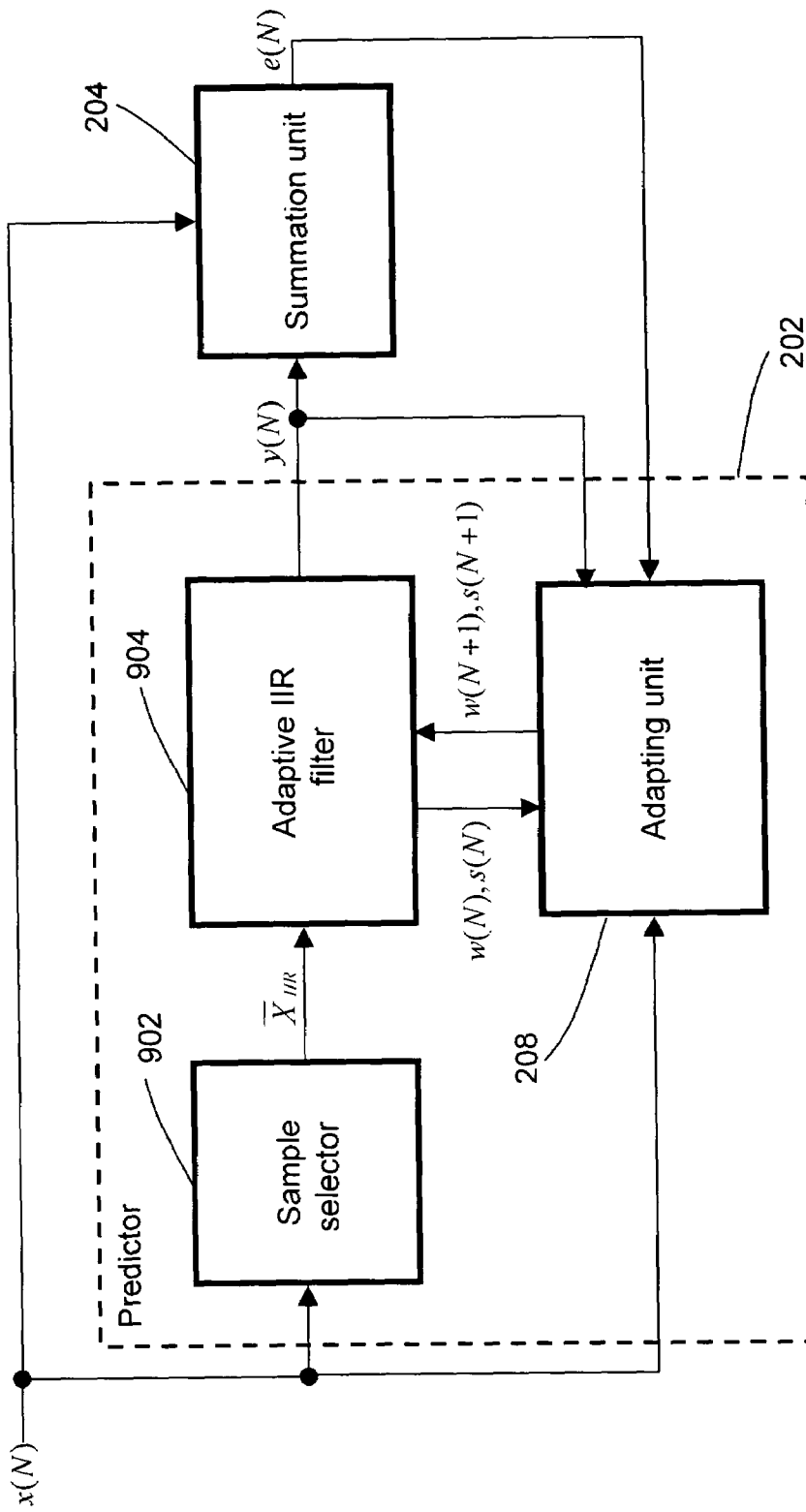
FIG. 9 is a block diagram illustrating a predictor, in accordance with an IIR embodiment of the present invention.

Referring now primarily to FIG. 9, predictor 202, in accordance with the IIR embodiment, is hereinafter described. In accordance with the IIR embodiment, predictor 202 comprises a sample selector 902 and an adaptive IIR filter 904, in addition to adapting unit 208. Sample selector 902 selects the set of samples as past samples $\overline{X}_{IIR}$. Adaptive IIR filter 904 obtains predicted current sample y(N) by using past samples $\overline{X}_{IIR}$ and a set of previously predicted samples. In an embodiment of the present invention, adaptive IIR filter 904 obtains current sample y(N) by using equation (6).

Figure 10:
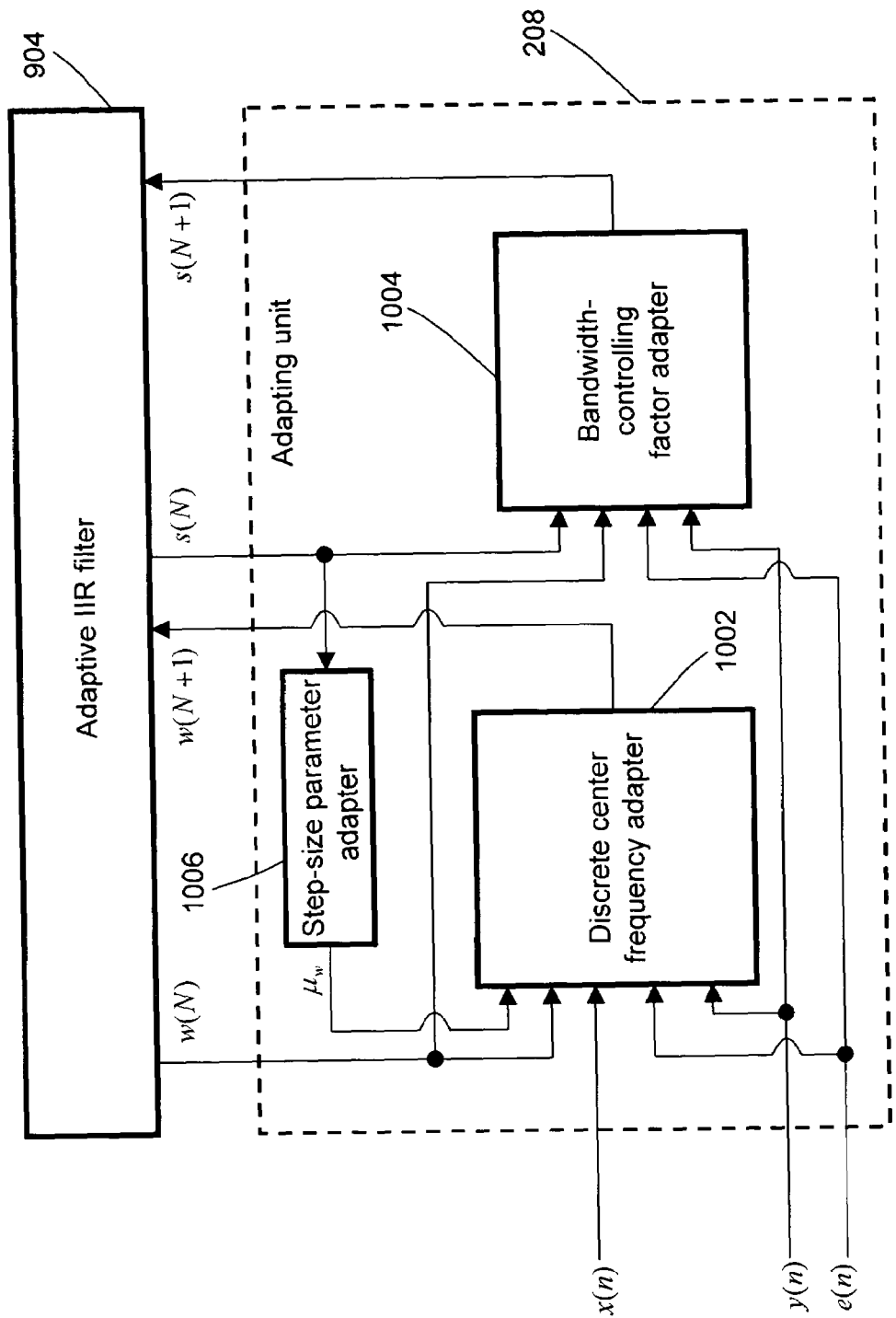
FIG. 10 is a block diagram illustrating an adapting unit, in accordance with an IIR embodiment of the present invention.

Referring now primarily to FIG. 10, adapting unit 208, in accordance with the IIR embodiment, is hereinafter described. In accordance with the IIR embodiment, adapting unit 208 comprises a discrete center frequency adapter 1002, a bandwidth-controlling factor adapter 1004, and a step-size parameter adapter 1006. Discrete center frequency adapter 1002 uses actual samples of received signal x(n), predicted samples y(n), prediction error values e(n), and first step-size parameter $\mu_w$ to update discrete center frequency parameter w(n) by using equation (7). Further, discrete center frequency adapter 1002 comprises a first partial differentiator. The first partial differentiator obtains partial derivative α(N) of y(n) with respect to w(n) at current discrete time instant N using equation (10). Bandwidth-controlling factor adapter 1004 uses predicted samples y(n), prediction error values e(n), and discrete center frequency parameter w(N) at current discrete time instant N to update bandwidth-controlling factor s(n), by using equation (8). Further, bandwidth-controlling factor adapter 1004 comprises a second partial differentiator. The second partial differentiator obtains partial derivative β(N) of y(n) with respect to s(n) at current discrete time instant N using equation (11). Step-size parameter adapter 1006 updates first step-size parameter $\mu_w$ depending on the bandwidth-controlling factor s(N) corresponding to current discrete time instant N, using the equation (9).

The present invention may be implemented by using a dedicated Application Specific Integrated Circuit (ASIC). Alternately, it may be implemented by using a Digital Signal Processor (DSP) chip or a Field Programmable Gate Array (FPGA). It will be apparent to one skilled in the art that the present invention may also be embodied in a computer program product by using either a processor-specific assembly language or a high-level language such as C. The computer program product embodiment of the present invention can be used for either the implementation of the present invention or that of a simulation model of the present invention.

The present system, method and computer program product provide for the accurate detection of the frequency burst. The present invention results in a fewer number of misses and false detections of the frequency burst. Further, the present invention achieves the above in a computationally efficient manner. Additionally, the adaptive filter adapts on the basis of prediction error. Therefore, the center frequency of the pass band of the adaptive filter gets adapted according to the frequency offset in received signal x(n). This makes the performance of the present invention less sensitive to frequency offsets. The FIR embodiment of the present invention provides the above advantages, along with high computational efficiency. On the other hand, the IIR embodiment of the present invention provides a very accurate detection of the frequency burst, since the bandwidth of the adaptive filter can be made very narrow without causing misses.

While the preferred embodiments of the invention have been illustrated and described, it is clear that the invention is not limited to these embodiments only. Numerous modifications, changes, variations, substitutions and equivalents will be apparent to those skilled in the art, without departing from the spirit and scope of the invention, as described in the claims.

What is claimed is:

1. A method for detecting a complex frequency burst in a received complex signal at a wireless receiver, the complex frequency burst having a known length, the method comprising the steps of:
   a. filtering past samples of the received complex signal using a complex signal based adaptive filter to obtain a filtered current sample of the received complex signal;
   b. obtaining a complex error between the filtered current sample of the received complex signal and an actual current sample of the received complex signal;
   c. adapting the adaptive filter using the complex error; and
   d. locating the complex frequency burst using the complex error, wherein the step of locating the complex frequency burst using the complex error comprises the steps of:
   if a previous sample of the received complex signal is established to belong to the complex frequency burst, then performing the step of:
      analyzing the complex error to establish whether the previous sample of the received complex signal is a last sample of the complex frequency burst; and
   if the previous sample of the received complex signal is not established as the last sample of the complex frequency burst, then performing the step of:
      establishing that the current sample of the received complex signal belongs to the complex frequency burst; and
   if the previous sample of the received complex signal is not established to belong to the complex frequency burst, then performing the step of:
      analyzing the complex error to establish whether the current sample of the received complex signal belongs to the complex frequency burst.

2. The method as recited in claim 1, wherein the step of analyzing the complex error to establish whether the current sample of the received complex signal belongs to the complex frequency burst comprises the steps of:
   calculating an inaccuracy parameter using the complex error; and if the inaccuracy parameter is less than an error power threshold, then performing the step of:
      establishing that the current sample of the received complex signal belongs to the complex frequency burst.

3. The method as recited in claim 2, wherein the step of calculating the inaccuracy parameter using the complex-error is performed using the relation $\overline{E}(N)=(1-\rho)*\overline{E}(N-1)+\rho*|e(N)|^2$, where N denotes a discrete time instant of the current sample, $\overline{E}(n)$ is the inaccuracy parameter at $n^{th}$ discrete time instant, e(n) is the complex error at $n^{th}$ discrete time instant and ρ is a forgetting factor.

4. The method as recited in claim 2, wherein the step of calculating the a prediction inaccuracy parameter using the complex prediction error is performed by calculating an average power of the complex prediction error over a predetermined number of discrete time instants preceding the discrete time instant of the current sample.

5. The method as recited in claim 1, wherein the step of analyzing the complex error to establish whether the previous sample of the received complex signal is the last sample of the complex frequency burst comprises the steps of:
   obtaining an error power parameter using the complex error corresponding to the current sample;
   calculating an-inaccuracy parameter using the complex error corresponding to the current sample;
   obtaining the ratio of the error power parameter and the inaccuracy parameter corresponding to the current sample; and
   if the ratio corresponding to a previously received sample established to belong to the complex frequency burst is less than a first ratio threshold, and the ratio corresponding to the current sample of the received complex signal is greater than a second ratio threshold, then performing the step of:

establishing that the previous sample of the received complex signal is the last sample of the complex frequency burst.

6. The method as recited in claim 5, wherein the step of obtaining the error power parameter is performed by obtaining an absolute value of the complex error.

7. The method as recited in claim 1, wherein the step of locating the complex frequency burst using the complex error further comprises the step of locating the start of the complex frequency burst using the end of the complex frequency burst and the known length of the complex frequency burst.

8. The method of claim 1, wherein the step of adapting the adaptive filter using the complex error comprises the steps of:

e. obtaining the product of the complex conjugate of the complex-error, a past sample of the received complex signal corresponding to a first complex coefficient of the adaptive filter and a convergence step-size corresponding to the first complex coefficient of the adaptive filter;

f. adding the obtained product to the first complex coefficient of the adaptive filter to obtain the adapted value of the first complex coefficient of the adaptive filter; and g. repeating step-e and step-f for each complex coefficient of the adaptive filter, whereas the adaptive filter is a complex coefficient based finite impulse response (FIR) filter.

9. The method of claim 1, wherein the step of filtering the past samples of the received complex signal using the complex signal based adaptive filter is performed using the relation $$y(N)=(1+s(N))w(N)y(N-1)-s(N)y(N-2)+(1-s(N))(w(N)x(N-D)-x(N-D-1)),$$

where N denotes a discrete time instant of the current sample, D denotes a predefined number of discrete time instants before the current sample, y(N) denotes the filtered current sample of the received complex signal, y(n) denotes a filtered sample of the received complex signal at $n^{th}$ discrete time instant, x(n) denotes the actual sample of the received complex signal at $n^{th}$ discrete time instant, w(n) denotes a discrete center frequency parameter of the complex signal based adaptive filter at $n^{th}$ discrete time instant, and s(n) denotes a bandwidth-controlling factor of the complex signal based adaptive filter at the $n^{th}$ discrete time instant.

10. The method as recited in claim 1, wherein the step of adapting the complex signal based adaptive filter using the complex error comprises the steps of:

updating the discrete center frequency parameter using the relation $w(N+1)=w(N)+2 \mu_w$ real$(e(N)\alpha(N)^*)$, where $\mu_w$ is a first step-size parameter, e(n) denotes the complex error at $n^{th}$ discrete time instant and $\alpha(n)$ denotes the partial derivative of the y(n) with respect to w(n) at the $n^{th}$ discrete time instant;

updating the bandwidth-controlling factor using the relation $$s(N+1) = s(N) + 2\mu_s \text{real}\left(\frac{1}{(1-s(N))^2} y^2(N) + \frac{1+s(N)}{1-s(N)} y(N)\beta(N)\right),$$

where $\mu_s$ is a second step-size parameter and $\beta(n)$ denotes the partial derivative of y(n) with respect to s(n) at the $n^{th}$ discrete time instant, wherein the value of $\mu_s$ is predefined; and updating the first step-size parameter $\mu_w$ using the relation $$\mu_w=0.1(1-s)(N))^3.$$

11. The method as recited in claim 10, wherein the step of updating the discrete center frequency parameter comprises the step of obtaining $\alpha(N)$ using the relation $$\alpha(N)=(1+s(N))w(N)\alpha(N-1)-s(N)\alpha(N-2)+(1+s(N))y(N-1)+(1-s(N))x(N-D).$$

12. The method as recited in claim 10, wherein the step of updating the bandwidth-controlling factor comprises the step of obtaining $\beta(N)$ using the relation $$\beta(N)=(1+s(N))w(N)\beta(N-1)-s(N)\beta(N-2)-(w(N)e(N-1)-e(N-2)).$$

13. The method as recited in claim 1, wherein at least one of the steps is embodied in a computer program product.

14. A system for detecting a complex frequency burst in a received complex signal at a wireless receiver, the system comprising:

a. a complex signal based adaptive filter filtering past samples of the received complex signal to obtain a filtered current sample of the received complex signal;

b. a summation unit obtaining a complex error using the filtered current sample of the received complex signal and an actual current sample of the received complex signal;

c. an adapting unit adapting the complex signal based adaptive filter using the complex error; and d. a complex frequency burst detector locating the complex frequency burst using the complex error, wherein the complex frequency burst detector comprises:

i. a complex frequency burst presence flag for recording whether a previous sample of the received complex signal is established to belong to the complex frequency burst;

ii. an inaccuracy calculator calculating an inaccuracy parameter using the complex error and setting the complex frequency burst presence flag if the inaccuracy parameter is less than an error power threshold;

iii. a ratio calculator calculating an error power parameter using the complex error and obtaining a ratio of the error power parameter and the inaccuracy parameter if the complex frequency burst presence flag is set; and iv. an end detector establishing whether the previous sample of the received complex signal is the last sample of the complex frequency burst using the obtained ratio and resetting the flag if the previous sample of the received complex signal is the last sample of the complex frequency burst.

15. The system as recited in claim 14, wherein the end detector comprises:

a complex frequency burst location flag recording whether the ratio obtained by the ratio calculator is less than a first ratio threshold;

a first threshold detector setting the complex frequency burst location flag if the ratio obtained by the ratio calculator is less than the first ratio threshold; and a second threshold detector establishing that the previous sample of the received complex signal is the last sample of the complex frequency burst if the complex frequency burst location flag is set and the ratio obtained by the ratio calculator is greater than a second ratio threshold.

16. The system as recited in claim 14, wherein the adapting unit comprises:
- a multiplier obtaining the product of the complex conjugate of the complex error, a past sample of the received complex signal corresponding to each complex coefficient of the complex signal based adaptive filter and a convergence step-size corresponding to each complex coefficient of the complex signal based adaptive filter; and
- an adder adding the obtained product corresponding to each complex coefficient of the complex signal based adaptive filter to the corresponding complex coefficients of the complex signal based adaptive filter, to obtain the adapted values of complex coefficients of the complex signal based adaptive filter, whereas the complex signal based adaptive filter is a complex coefficient based finite impulse response (FIR) filter.

17. The system as recited in claim 14, wherein the complex signal based adaptive filter comprises:
- an adaptive IIR filter, the adaptive IIR filter using the past samples of the received complex signal, and past filtered samples of the received complex signal to obtain the filtered current sample of the received complex signal $y(N)$ using the relation:

$$y(N)=(1+s(N))w(N)y(N-1)-s(N)y(N-2)+(1-s(N))(w(N)x(N-D)-x(N-D-1)),$$

where N denotes the discrete time instant of the current sample, D denotes a predefined number of discrete time instants before the current sample, $y(n)$ denotes the filtered sample of the received complex signal at $n^{th}$ discrete time instant, $x(n)$ denotes the sample of the received complex signal at $n^{th}$ discrete time instant, $w(n)$ denotes a discrete center frequency parameter of the complex signal based adaptive filter at $n^{th}$ discrete time instant, and $s(n)$ denotes a bandwidth-controlling factor of the complex signal based adaptive filter at the $n^{th}$ discrete time instant.

18. The system as recited in claim 17, wherein the adapting unit comprises:
- a discrete center frequency adapter updating the discrete center frequency parameter using the relation
  $w(N+1)=w(N)+2\mu_w$ real $(e(N)\alpha(N)^*)$, where $\mu_w$ is a first step-size parameter, $e(n)$ denotes the complex error at $n^{th}$ discrete time instant and $\alpha(n)$ denotes the partial derivative of the $y(n)$ with respect to $w(n)$ at the $n^{th}$ discrete time instant;
- a bandwidth-controlling factor adapter updating the bandwidth-controlling factor using the relation $$s(N+1) = s(N) + 2\mu_s \mathrm{real}\left(\frac{1}{(1-s(N))^2}y^2(N) + \frac{1+s(N)}{1-s(N)}y(N)\beta(N)\right),$$

where $\mu_s$ is a second step-size parameter and $\beta(n)$ denotes the partial derivative of $y(n)$ with respect to $s(n)$ at the $n^{th}$ discrete time instant, wherein the value of $\mu_s$ is predefined; and
- a step-size parameter adapter updating the first step-size parameter $\mu_w$ using the relation $\mu_w=0.1(1-s(N))^3$.

19. The system as recited in claim 18 wherein the discrete center frequency adapter comprises a first partial differentiator obtaining $\alpha(N)$ using the relation $$\alpha(N)=(1+s(N))w(N)\alpha(N-1)-s(N)\alpha(N-2)+(1+s(N))y(N-1)+(1-s(N))x(N-D).$$

20. The system as recited in claim 18 wherein the bandwidth-controlling factor adapter comprises a second partial differentiator obtaining $\beta(N)$ using the relation:

$$\beta(N)=(1+s(N))w(N)\beta(N-1)-s(N)\beta(N-2)-(w(N)e(N-1)-e(N-2)).$$

\* \* \* \* \*